Patented May 30, 1933

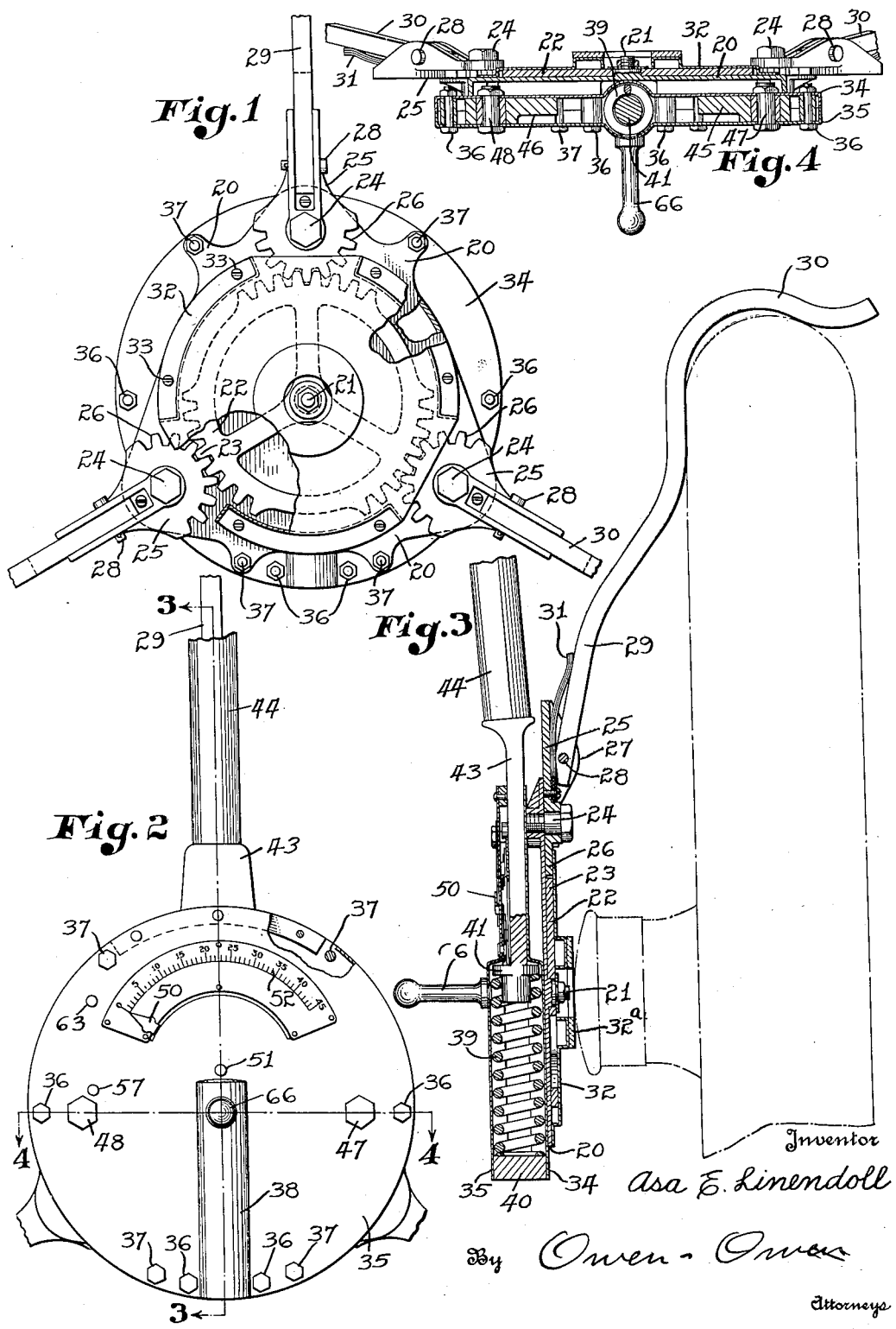

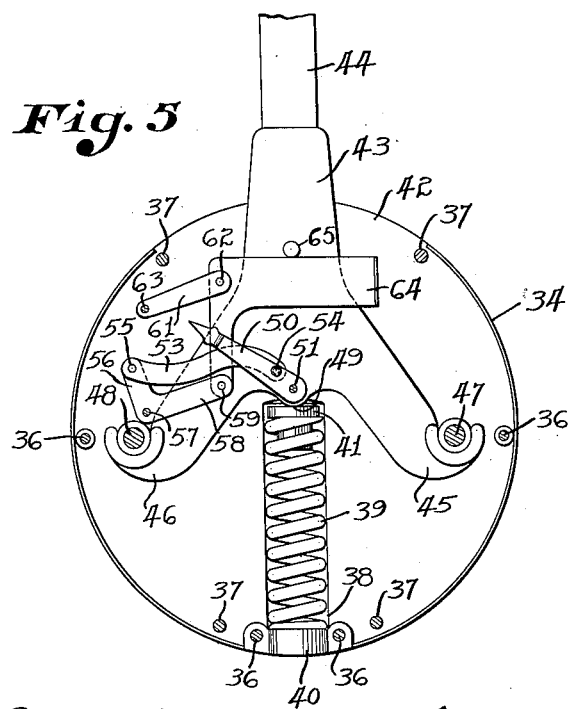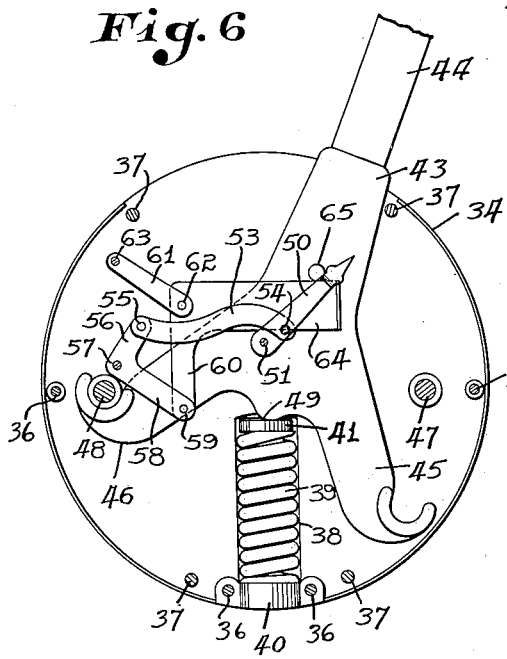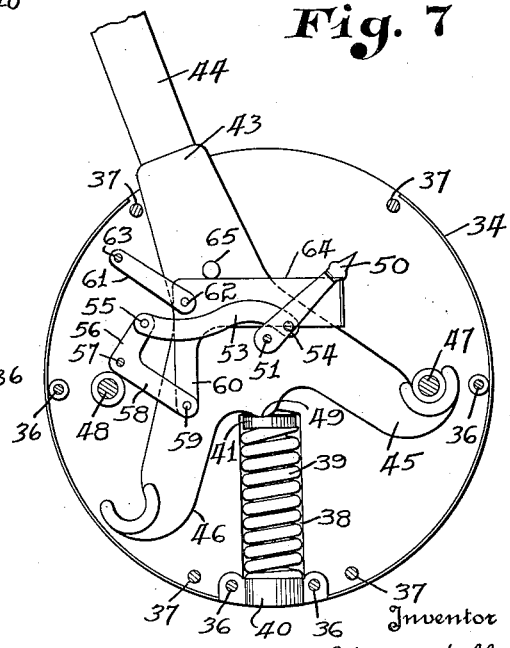

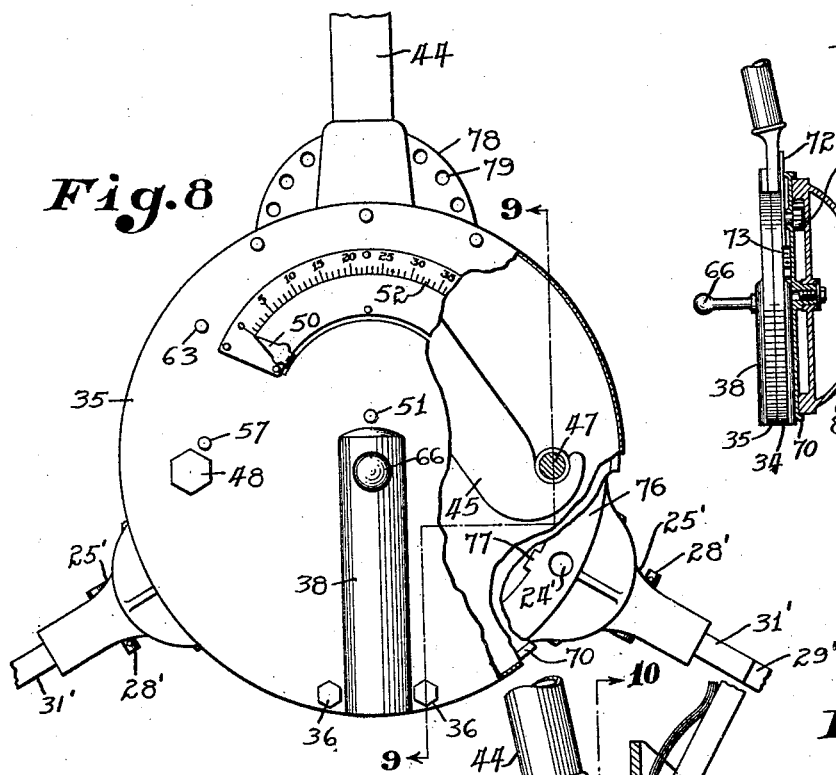
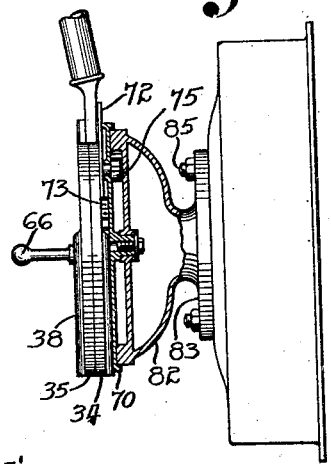
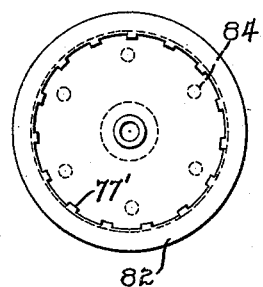
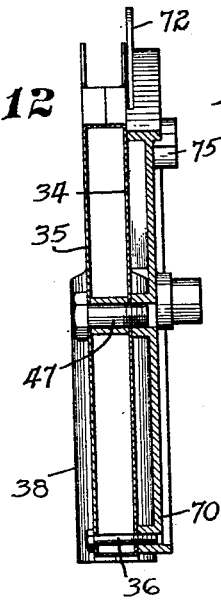
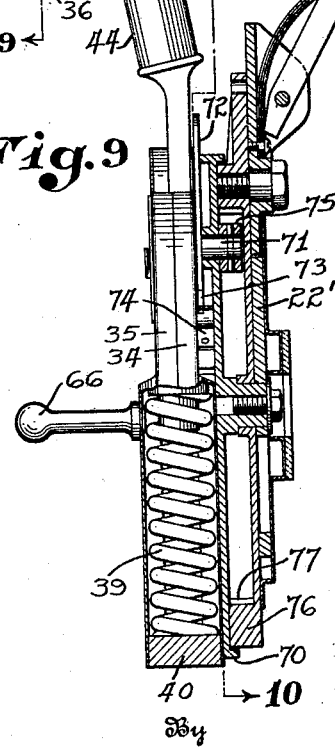

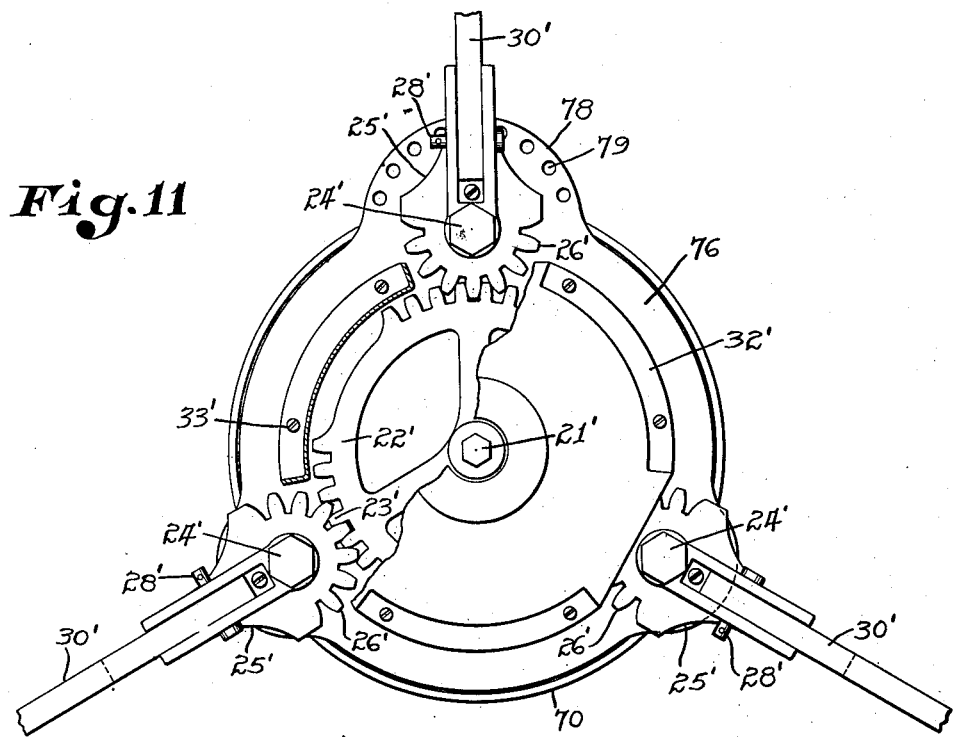
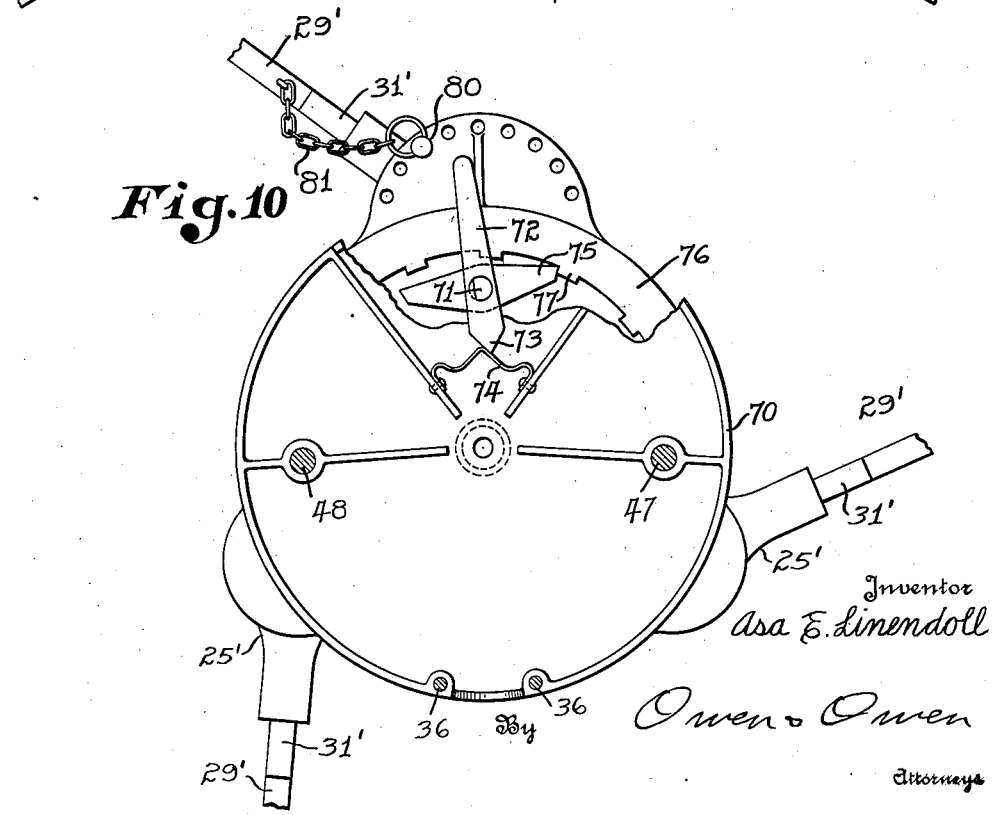

1,912,286

UNITED STATES PATENT OFFICE

ASA E. LINENDOLL, OF NORWALK, OHIO

BRAKE TESTER

Application filed September 19, 1930. Serial No. 482,941.

This invention relates to a brake tester and more particularly to a hand operated device for turning a wheel against the resistance of the brake.

The purpose of the invention is to supply a tester of the kind indicated which can be easily and quickly applied to and removed from a wheel and which will be self centering and which will reliably and accurately indicate the resistance met with, without the necessity of a skilled or experienced operator. The details of the invention will appear as the description proceeds.

In the accompanying drawings forming a part of this specification, Figure 1 is a partial view of one form of the invention as viewed from the side which is applied to the wheel, hereafter termed "the rear side", with parts broken away; Fig. 2 is a view of the front side of the device, with parts broken away; Fig. 3 is a vertical section of the device with a wheel indicated, the section being taken on the line 3—3 of Fig. 2; Fig. 4 is a horizontal section of the device; Figs. 5, 6 and 7 are views of the operating handle and its associated parts in different positions, the front of the casing being removed; Fig. 8 is a view similar to Fig. 2 showing a modified form of the device; Fig. 9 is a section on the line 9—9 of Fig. 8; Fig. 10 is a section on the line 10—10 of Fig. 9; Fig. 11 is a rear view of the device shown in Fig. 8, part of the casing being broken away; Fig. 12 is a section somewhat similar to Fig. 9, but with parts removed; Fig. 13 is a view of a modified form of the device adapted for use when the wheel is removed, and Fig. 14 is a front view of the attaching device shown in Fig. 13.

In the embodiment of the invention shown in the drawings there is a plate 20 having a central bearing 21 upon which there is mounted a wheel 22 having a series of cogs 23 around its periphery. Mounted upon plate 20, beyond wheel 22, there are pivots 24 carrying members 25 having cogs 26 adapted to mesh with cogs 23. Mounted upon each member 25 there are ears 27 through which there passes a pin 28, upon which is mounted an arm 29 having an end 30 adapted to hook over the tread of the tire. A spring 31 interposed between member 25 and arm 29 presses the arm towards a position at right angles to the plane of member 20. By this construction, hooks 30 are resiliently held towards each other so that they may be readily placed upon wheels of varying diameter. At the same time, the arms and plate 20 are arched away from the hub of the wheel until torsion is applied.

Member 22 is covered by a plate 32 connected to plate 20 by means of screws 33 or the like. A leather washer 32ª prevents plate 32 from marring the hub cap when pressed thereagainst.

In front of plate 20 there is a housing comprising two circular members 34 and 35 which have flanges around their rims turned towards each other, so that when connected together, as by bolts 36, they form a cylindrical housing. This housing is connected to plate 20 by bolts 37. Members 34 and 35 are provided with pressed out portions 38 forming a housing for a strong spring 39, which is held up by a member 40 at the bottom of the housing and supports at its top an abutment member 41.

At the top of the housing the flanges are cut away at 42 to form a slot through which there works an arm 43 connected to an operating handle 44. Arm 43 is connected to diverging arms 45 and 46, which are adapted to hook beneath abutment members 47 and 48 fixed between members 34 and 35. Between arms 45 and 46 there is a rounded bearing portion 49 adapted to rest upon abutment member 41.

An indicating pointer 50 is pivoted at 51 upon member 35 and its free end works in cooperative relation with a scale 52 mounted upon member 35. A link 53 is pivoted to pointer 50 at 54 and has a pivotal connection 55 with the short arm 56 of a bell crank lever fulcrumed to the housing at 57. The long arm 58 of the bell crank lever is pivoted at 59 to a member 60. A link 61 is pivoted at 62 to member 60 and at 63 to the housing. Link 61 is of equal length with arm 58 and pivot 63 is vertically above pivot 57, whereby link 61 and arm 58 act as parallel links to maintain member 60 in upright position. An arm 64 of member 60 presents a horizontal surface to a pin 65 on arm 43.

The operation of the form of the device thus far described is as follows:

There is a handle 66 projecting from the front side of housing member 35 and this handle facilitates the placing of the device in position upon a wheel to be tested, the three hooks 30 being hooked over the tread of the tire.

The device is automatically centered in this way so that bearing 21 is co-axial with the bearing of the wheel. Thereupon handle 44 is turned in either direction which is convenient or desired for testing the brake and is moved towards the position in which it is shown in Fig. 6 or Fig. 7. During this turning movement of the handle, plate 20 turns with respect to the wheel so that arms 29 are moved form their radial position to angular positions. The toothed connections 23 and 26 insure that each arm is at the same angle and, therefore, the centered position of plate 20 is maintained.

It will be readily understood that plate 20 thus moves about its axis until the angle of arms 29 is such that they press tightly against the wheel and further turning movement meets with sufficient resistance so that spring 38 is compressed. Thereafter handle 44 is rocked about abutment 47 or 48, as the case may be, and as a result pin 65 depresses member 60 and through bell crank 58 and link 53 swings pointer 50, the distance to which pointer 50 is swung corresponding to the degree to which spring 39 is compressed. The pointer 50 moves the same distance in response to the application of a given torque in either direction.

When handle 44 is released, pointer 50 remains in the extreme position to which it has been moved by the turning of handle 44 until the pointer is positively moved back into its original position, the parts being so constructed that there is sufficient friction to insure the pointer remaining in any position in which it is placed until force is exerted to move it therefrom. In this way, the degree to which spring 38 has been compressed, and, therefore, the turning force exerted by handle 44, is indicated by the position of the pointer after the turning operation has ceased.

It will be readily understood that the construction of the device is such that it may be placed upon wheels varying considerably in diameter, and that by the first turning movement it is automatically centered upon the wheel and thereafter indicates the force applied to turn the wheel, and that this force is indicated equally in whichever way handle 44 is turned, and is an accurate indication of the resistance afforded by the brake.

In Figs. 8 to 11 there is indicated a modified device suitable for use where it is desired to turn the wheel through an arc greater than that which might be convenient for turning handle 44. In this device a plate 70 is attached to the housing in place of plate 20. Through the upper part of plate 70 there is a pin 71. Upon the end of the pin next to plate 34 there is a handle 72 projecting above the housing and extending below the pin to a point 73. A spring 74 against which point 73 rests presses handle 72 away from the radial line in whichever direction it is turned.

On the end of pin 71 away from plate 34 there is a two-arm pawl 75.

Cooperating with plate 70 there is a ratchet member 76 having internal teeth 77 with which pawl 75 cooperates. Members 22, 22' to 33', inclusive, are similar to the correspondingly numbered parts previously described, except that they are mounted upon member 76 instead of upon a plate 20. Extending upward from member 76 there is a segment 78 with an arcuate series of holes 79 through any one of which there may be placed a pin 80 which is attached by a chain 81 to an arm 29'.

As will be readily seen from Fig. 10, the pin 80 may be used to fasten arm 29' to the angular position in which it is placed by the turning movement of the device. The mechanism is thus held in tightened position upon the wheel. In operating this device, handle 44 may be given a turn sufficient to start the wheel against the resistance of the brake and at the end of this turning movement pin 80 may be slipped into the proper hole in order to maintain the arms 29' in their gripping position upon the wheel. Handle 44 may then be turned back in the opposite direction, turning the housing and plate 70 therewith, pawl 75 slipping past teeth 77 during this reverse movement and engaging the teeth when handle 44 is again turned in the original direction. In this way, the wheel may be given as many successive partial turns as desired so that it may be given a complete revolution, if desired, and in this way it may be determined whether there is a greater resistance at one point in the revolution than at another point and the maximum resistance during the revolution may be ascertained.

It will be readily understood that by moving handle 72 either end of pawl 75 may be rendered operative as desired, so that the turning may be in either direction which is convenient or desired.

It sometimes happens that it is desirable to test the brake with the wheel removed. Under such circumstances, member 76 may be removed and in place thereof there may be employed a member 82 shown in Figs. 13 and 14. This member 82 is provided with internal teeth 77' adapted to cooperate with pawl 75. At its side next to the wall it is provided with a flange 83 having holes 84 adapted to receive the bolts 85, which normally attach the wheel to the running gear.

It will be readily understood that a member similar to member 82, but without internal teeth, might be attached to the housing formed by plates 34 and 35 without any interposed member 70 in case the ratchet operation was not desired.

It will readily be seen that by the above described arrangement a device is supplied which can be readily applied to wheels varying in sizes within the range usually encountered and which will be readily tightened and centered upon such wheel; that where desired the device may be made to turn the wheel through one or more complete revolutions; that it may be applied to a wheel or by a simple change in attachment it may be applied to the hub in place of a wheel; and that, however applied, it accurately indicates the maximum resistance met with in the turning of the wheel, and that the turning is in such a way that the resistance thus encountered in turning two or more wheels will be strictly comparable, so that if the resistance indicated by this device for two wheels is the same, the actual resistance exerted by their brakes in practice is found to be equal.

It will be readily understood that various changes may be made in the size, shape and arrangement of the various parts and other changes may be made within the scope of the appended claims.

What I claim is:

1. Apparatus for testing brakes comprising a torque applying and measuring device adapted to be oscillated through a limited arc, a carrier, means for attaching the carrier to a rotatable braked member, and ratchet means connecting the torque applying device and the carrier, said ratchet device comprising a ratchet wheel attached to one of said members and a double armed pawl pivoted on the other member and movable to engage the ratchet wheel on either side of the pivot of the pawl, as desired.

2. Apparatus for testing brakes comprising a torque applying and measuring device adapted to be oscillated through a limited arc, a carrier, means for attaching the carrier to a rotatable braked member, and ratchet means connecting the torque applying device and the carrier, said ratchet means comprising a ratchet wheel attached to one of said members and a double armed pawl pivoted on the other member between the two arms, a spring engaging said pawl and adapted to maintain either of the arms in engagement with the ratchet wheel when brought into engagement therewith, and a handle on the pawl adapted to swing the pawl so as to bring the desired arm into engagement with the ratchet wheel.

3. Apparatus for testing brakes comprising a torque applying and measuring device, a carrier, ratchet means for connecting the torque device to the carrier, arms pivoted upon the carrier and having means at their outer ends adapted to engage the tread of a tire, connections between the several arms maintaining them at equal angles to the carrier, and means for holding the arms at any angle to the carrier to which they are forced by the turning of the carrier.

4. A brake testing apparatus comprising a torque applying and measuring device, a carrier, ratchet connections between the device and the carrier, arms pivotally mounted upon the carrier and having hooks at their outer ends adapted to engage the tread of a tire, and segmental toothed projections upon their ends towards the axis of the carrier, a gear pivotally mounted upon the axis of the carrier and having teeth engaging the teeth of said segments, and means on the carrier adjacent one of said arms to hold the arm at any angular position with respect to the carrier to which it is swung.

5. Apparatus for testing brakes comprising a torque applying device, a carrier adapted to be mounted concentrically upon a rotatable braked member, and connections between the torque applying device and the carrier, said torque applying device comprising a housing, two spaced abutments within the housing, a spring between the abutments and acting along a line perpendicular to the line connecting said abutments, means for indicating the degree to which the spring is compressed, and an operating handle having a part adapted to rest upon said spring and having diverging arms adapted to engage with the respective abutments.

6. Apparatus for testing brakes comprising a torque applying device, a carrier adapted to be mounted concentrically upon a rotatable braked member, and connections between the torque applying device and the carrier, said torque applying device comprising a housing, spaced abutments in the housing, a spring midway between the abutments and acting along a line perpendicular to the line connecting the abutments, means for indicating the degree to which the spring is compressed, and an operating handle extending normally in the line of movement of the spring and resting upon the spring and having diverging arms engaging the respective abutments, each arm being movable away from its respective abutment on the side towards which the spring is compressed.

7. Apparatus for testing brakes comprising a torque applying device, a carrier adapted to be mounted concentrically upon a rotatable braked member, and connections between the torque applying device and the carrier, said torque applying device comprising a housing, a handle operable within the housing to apply torque to the housing, yielding means through which the handle applies torque to the housing, a scale upon the housing, a pointer pivoted upon the housing in cooperative relation with the scale, a pin upon the handle, a member having a straight edge in position to be contacted by said pin, parallel equal links connecting said member to the housing, whereby the member is maintained with the different positions of said edge parallel with each other, and connections between said member and the pointer to move the pointer in accordance with the movement of said member.

8. Apparatus for testing brakes comprising a torque applying device, a carrier adapted to be mounted concentrically upon a rotatable braked member, and connections between the torque applying device and the carrier, said torque applying device comprising a housing, a handle movable in opposite directions, a spring symmetrically resisting the oscillation of the handle in either direction, a pin on the handle, a member having a straight edge in position to be contacted by the pin, parallel equal links connecting the member to the housing and maintaining it with its straight edge perpendicular to the line of resistance of said spring, a scale on the housing, and a pointer connected to said member and cooperating with the scale to indicate the movement of the member.

In testimony whereof I have hereunto signed my name to this specification.

ASA E. LINENDOLL.